J. L. DALTON & J. MAGNUS.
ADDING AND RECORDING MACHINE.
APPLICATION FILED JUNE 28, 1909.
1,049,057.
Patented Dec. 31, 1912.
6 SHEETS—SHEET 5.
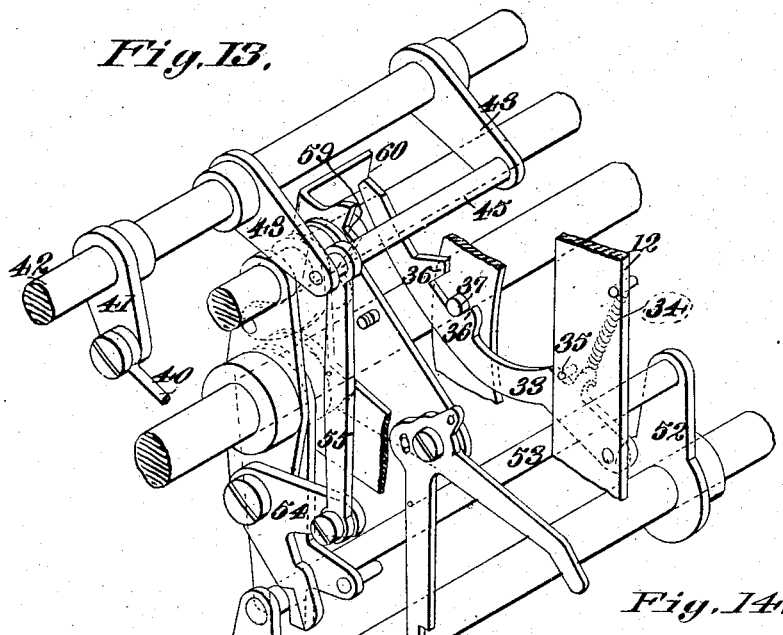
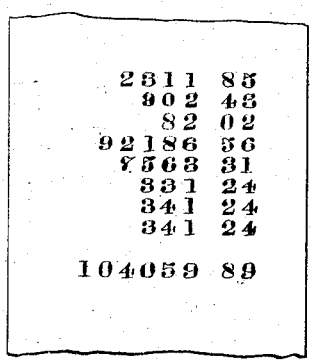
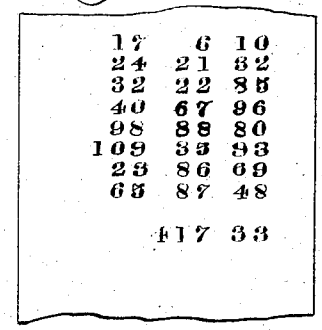
Attest:
Inventors.
James L. Dalton
John Magnus
by J. D. Rippey.
Atty J. L. DALTON & J. MAGNUS.
ADDING AND RECORDING MACHINE.
APPLICATION FILED JUNE 28, 1909.
1,049,057.
Patented Dec. 31, 1912.
6 SHEETS—SHEET 6.
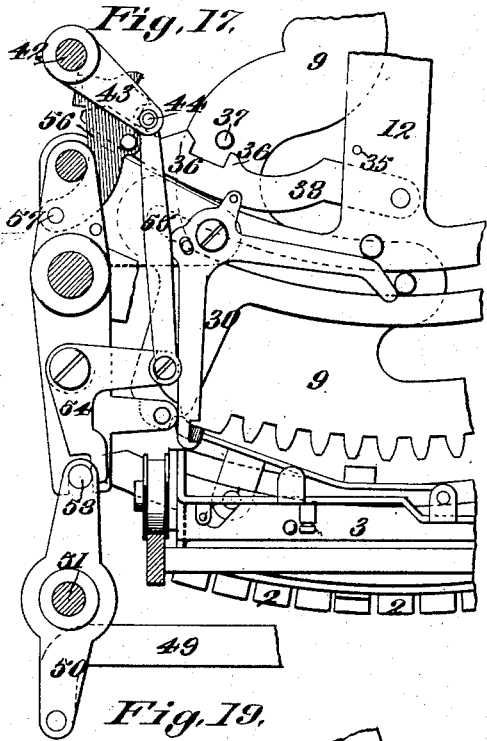
Fig. 17.
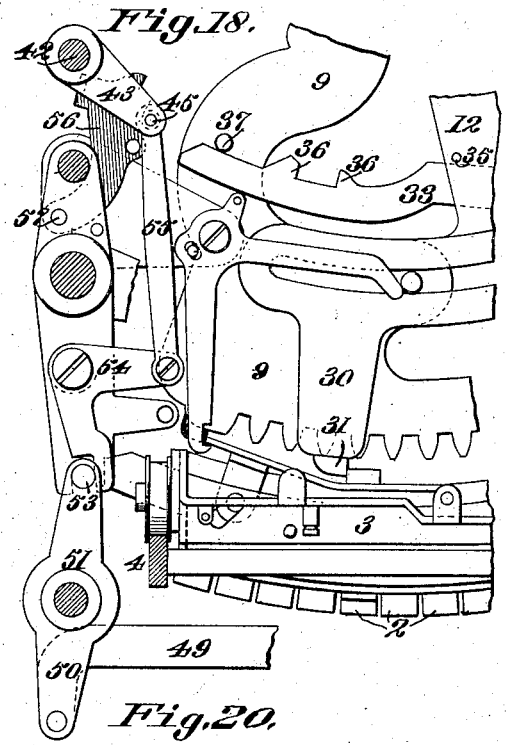
Fig. 18.
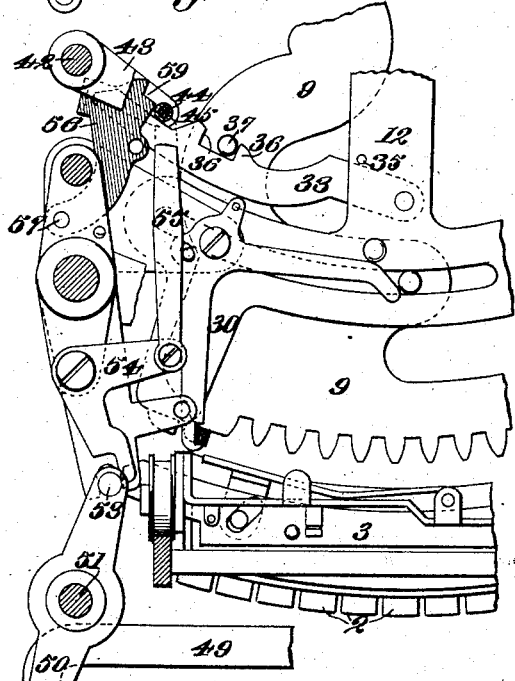
Fig. 19.
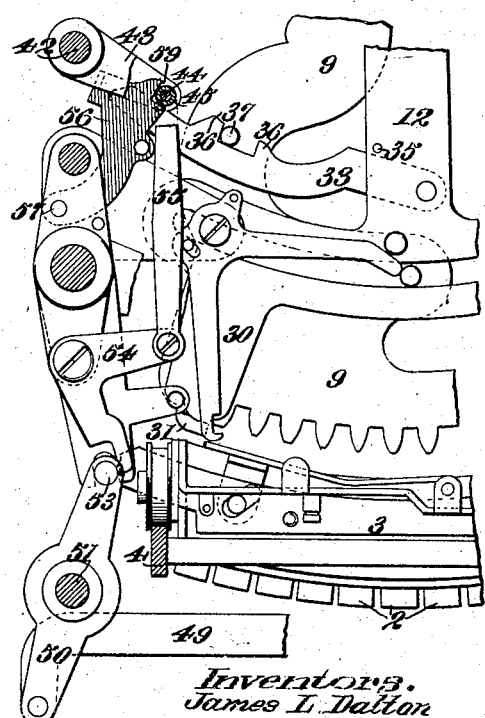
Fig. 20.
Fig. 21.
Inventors.
James L. Dalton
John Magnus
By J. D. Rippey,
atty
Attest

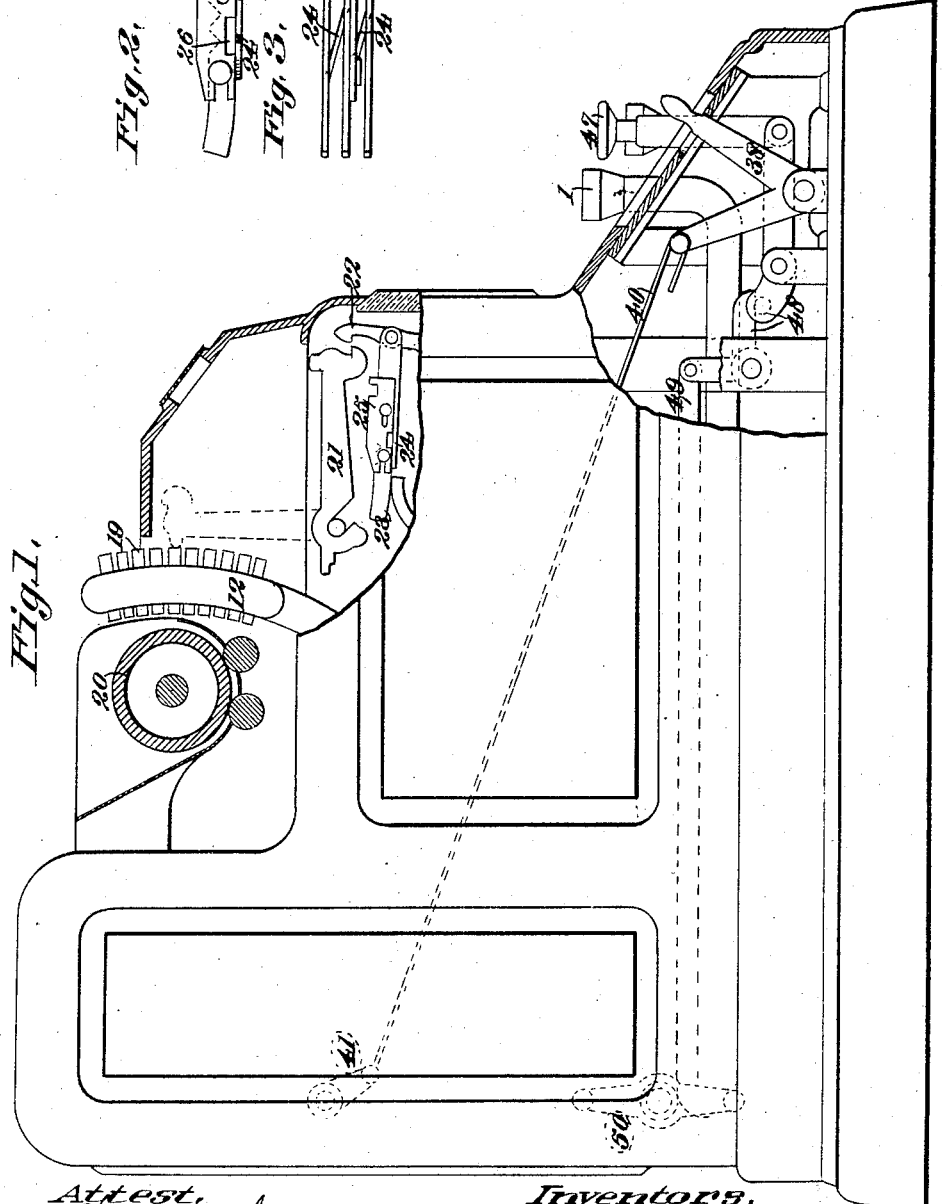

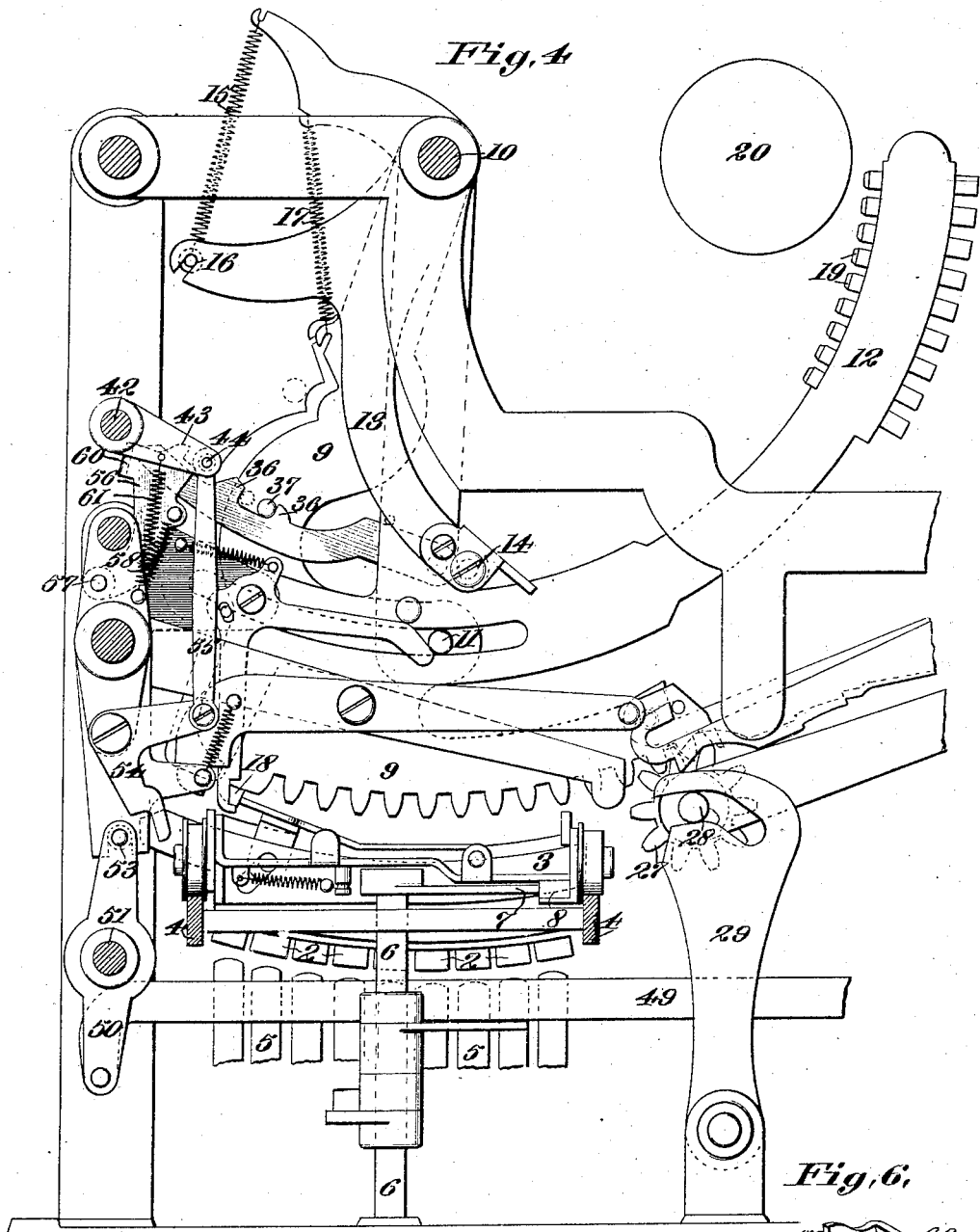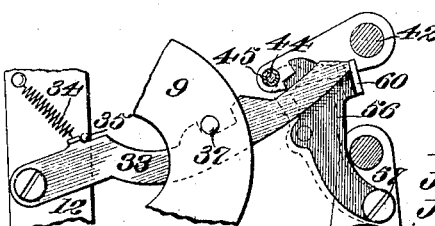

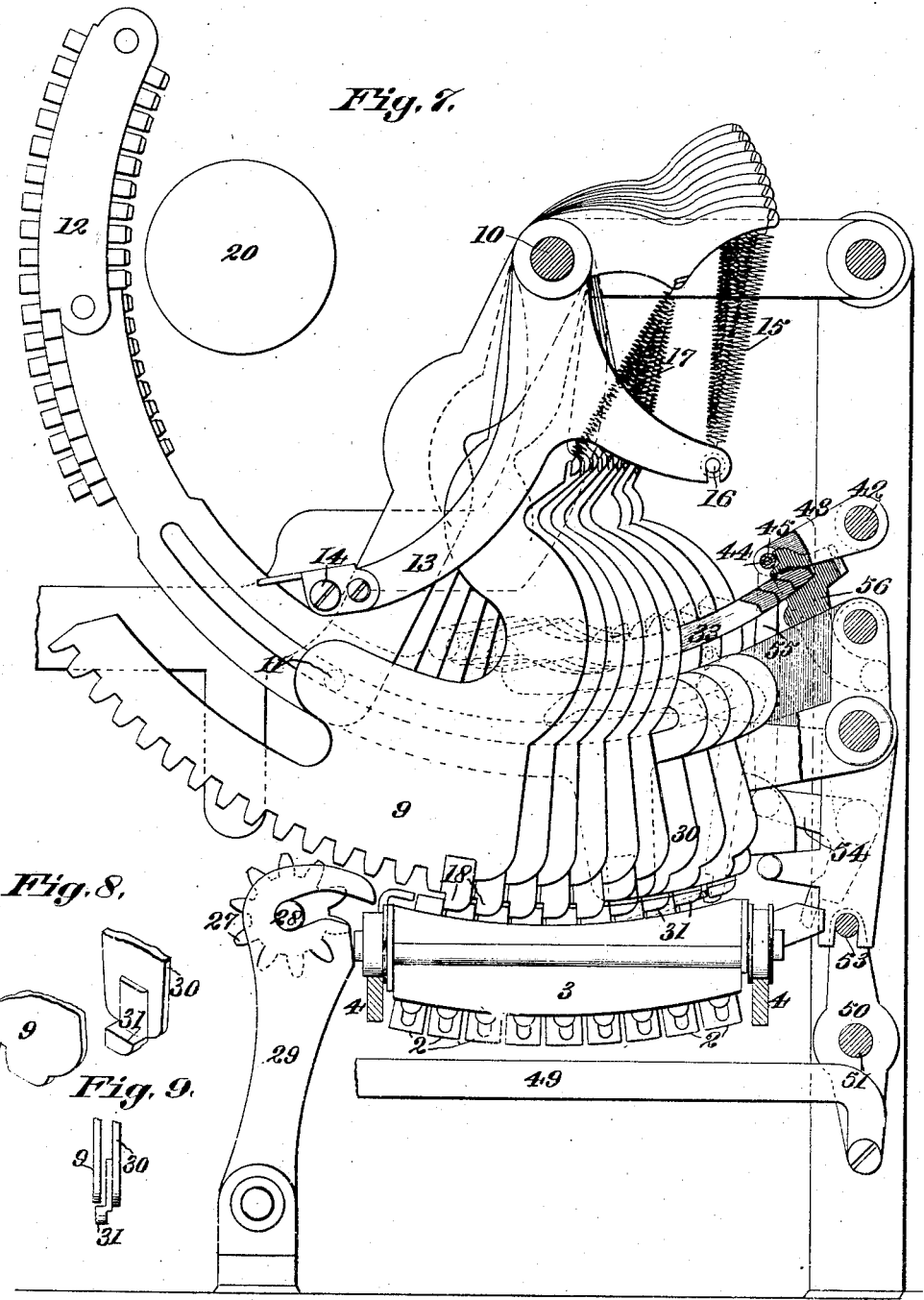

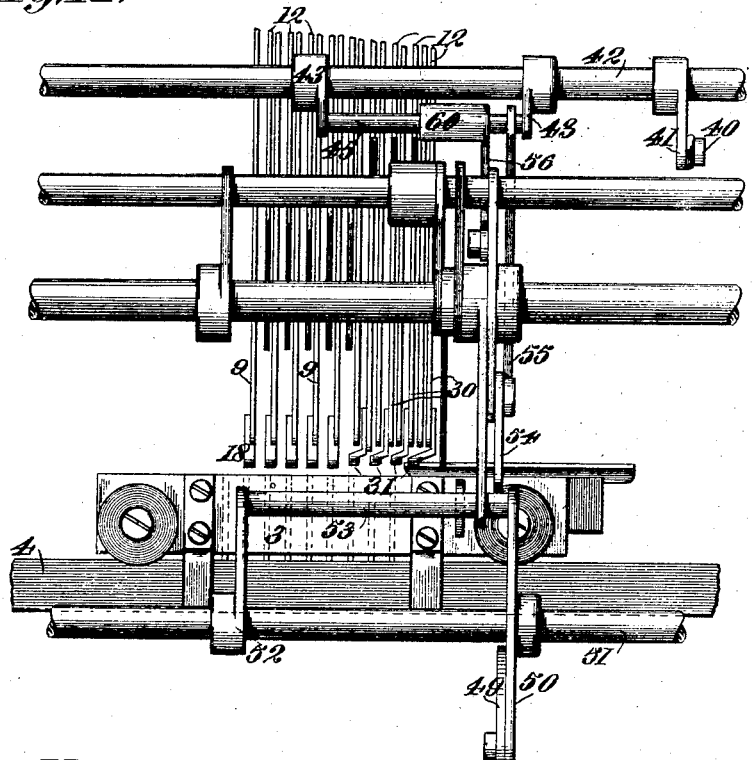

UNITED STATES PATENT OFFICE.

JAMES L. DALTON AND JOHN MAGNUS, OF POPLAR BLUFF, MISSOURI, ASSIGNORS TO DALTON ADDING MACHINE COMPANY, OF ST. LOUIS, MISSOURI, A CORPORATION OF MISSOURI.

ADDING AND RECORDING MACHINE.

1,049,057.   Specification of Letters Patent.   Patented Dec. 31, 1912.

Application filed June 28, 1909. Serial No. 504,733.

*To all whom it may concern:*

Be it known that we, JAMES L. DALTON and JOHN MAGNUS, citizens of the United States, residing at Poplar Bluff, Missouri, have invented a new and useful Adding and Recording Machine, of which the following is a specification.

This invention relates to adding and recording machines of the type in which items may be recorded and added, and which are provided with recording devices whereby considerable data may be recorded adjacent to the items.

The object of the present invention, among others, is to provide recording mechanism operable to record any desired numbers, whether in single column, or, in a number of parallel columns simultaneously, in combination with adding mechanism under the control of the operator to such an extent that, when a number of columns are recorded simultaneously, a total of one of the columns will be constantly maintained while that portion of the totalizing mechanism which is entrained with the recording mechanism whereby the identifying data are recorded will be retained in idle position except when carried into by the transfer mechanism communicating with the lower orders. This enables the operator to record in one column the prices and other data, and simultaneously to record in another column identifying data, such as data specifying quantity and the like, while a total only of the first-named column will be produced in the machine.

Other objects and uses of the invention will appear from the following detailed description, references being made to the accompanying drawings in which—

Figure 1 is a side elevation, with a keyboard and a part of the recording mechanism shown in section, of a well known machine embodying the present invention. Figs. 2 and 3 are detailed views showing the device for completing or breaking the connection between adjacent parts of the printing devices, whereby the operator is enabled to record two or more parallel columns of data at the same time. Fig. 4 is a sectional view of the rear portion of an adding machine of the cross-carriage type embodying the present invention. Fig. 5 is a detailed view illustrating the coupling devices between the recording mechanism and the device which operate the totalizing mechanism. Fig. 6 is a perspective view of a supporting pawl included in the present invention. Fig. 7 is a side elevation of the type-carrying devices advanced to record figures from "0" to "8," inclusive. Fig. 8 is a perspective view showing the construction of the lower portion of the type-carrying devices and the modified construction of the devices which coöperate therewith to operate the totalizing mechanism. Fig. 9 shows the rear end of one of the type-carrying parts and its coöperating rack. Fig. 10 is a chart of the type alined at the printing line in Fig. 7. Fig. 11 is a rear end elevation of the type-carrying parts and their coöperating gear parts as embodied in our present machine. Fig. 12 is a plan view of the cross-carriage. Fig. 13 is a perspective view of the mechanism whereby a portion of the recording mechanism may be caused to operate to record numbers without operating the corresponding total mechanism. Fig. 14 is a perspective view of the adjustable lever contained in the key-board whereby previous mechanism is controlled. Fig. 15 illustrates a single column of figures and a total thereof as recorded by the recording mechanism when all of the recording mechanism and the totalizing mechanisms are in coöperative relation. Fig. 16 illustrates parallel columns of figures recorded simultaneously by the recording mechanism when that portion of the totalizing mechanism which is entrained with the recording devices by which one of said columns is recorded is held inoperative. Fig. 17 illustrates the position of the coupling between the type-carrying parts and the coöperating gear parts when the latter should be detained in idle position during operations of the former. Fig. 18 illustrates the advanced position of the type-carrying parts with respect to the idle gear parts. Fig. 19 shows the couplings uniting the coöperating type-carrying and gear parts. Fig. 20 illustrates the coupling locking the type-carrying and gear parts during operation of recording a total or item which is to be added. Fig. 21 is an illustration of items in parallel columns as recorded by the machine when the parts are adjusted as shown in Figs. 17 and 18.

For purposes of illustration we have embodied the present invention in a machine of the cross-carriage type of well known construction. An exemplification of this type of machine is found in the application of Hubert Hopkins, Serial No. 140,390 filed January 24th, 1903 and in British Patent No. 854, of 1904. Machines of that general type are now well known being extensively sold throughout the United States. Such machines include a set of keys 1 arranged in rows upon a keyboard and operable effectively to move pins 2 to represent numbers in the movable carriage 3 mounted, by means of suitable anti-friction devices, upon rails 4. (Fig. 4.) The digits of the numbers are struck successively on the keys corresponding thereto and the key terminals 5 strike corresponding pins in the carriage thereby setting the pins to represent the numbers so struck on the keys. A shaft 6 has a gear segment 7 enmeshed with a rack 8 on the carriage and permits the carriage to move step by step when the keys are operated. This brings the rows of pins successively over the key terminals so that only one pin in each row will be set at one time. These machines also include a series of racks 9 swinging from a shaft 10 and having pin-and-slot connection 11 with coöperating type-carriers 12 which are also suspended from the shaft 10. Arms 13 in these machines depend from the shaft 10 and have cross-bars 14 extending transversely in front of the depending portions of the racks and type-carriers. Normally and in idle position the type-carriers and gear parts rest rearwardly as shown in Fig. 4 being held in such position by the cross-bars 14. Springs 15 connect rearwardly projecting arms on the type-carriers with a rod 16 held by extensions of the arms 13. Springs 17 connect the extensions of the type-carriers with the rear portions of the rack supporting parts, thereby actuating the type-carriers forwardly and actuating the racks rearwardly. After any desired number has been set up in the carriage 3 the arms 13 are swung forwardly by suitable controlling devices (not shown) which operation swings the type-carriers forwardly through the medium of the springs 15. After certain movement of the type-carriers, the coöperating racks will also be swung forwardly until the heel pins 18 thereon contact with corresponding pins 2 which had been set to represent the number. Engagement of the racks with the set up pins stops the type-carriers in position to record the number which had been set up in the carriage and alines the proper type 19 at the printing line adjacent to the platen 20 (as shown in Fig. 7). After the type-carriers stop in proper position hammers 21 are automatically driven against type effectively to cause the type to record on paper passing over the printing surface of the platen. In the machines of the type referred to the printing hammers are held in normal position by engaging pawls 22. A bar 23 is pivoted to each of the pawls 22 and each bar has a projection 24 whereby when one bar is raised all other bars at the right thereof with respect to the operator may also be raised. (Figs. 1, 2 and 3.) At suitable points in this train of couplings means is provided to break the couplings and divide the continuous coupling into a series of couplings. Such means include sliding plates 25 under which the projection 24 extends and engages, when said plate is in one position. When moved to another position a notch 26 in said plate is brought over the projection 24 thereby permitting such projection to raise without movement on the part of the bars in the lower orders. This is commonly known as "split-key" mechanism and enables the operator to record a single column of items or two or more columns at the same time, as desired. Construction and operation of this mechanism is also well known, and, for that reason, need not be described in detail in this application.

For each type-carrier and gear part there is a total wheel 27, said wheels being mounted upon a shaft 28 supported by supports 29 and operable automatically to disengage from the racks 9 during forward movement of the latter and to become engaged with said racks during rearward movement of the latter and thereby to add the numbers recorded.

While a machine constructed as above described is operable to record a number of columns simultaneously it will also add the items of each column, and there is no means to prevent addition of the items of one column while adding those of another column. Neither is there any means by which the adding mechanism entrained with the recording mechanism of one column may be added into should such operation be necessary to maintain correct total of the items recorded in another column. The latter operation is impossible in the machines now on the market for the reason, as stated, that each set of recording devices operates the corresponding total wheels and, therefore, the total would be incorrect if carried into total wheels in which other numbers were represented.

Our present invention seeks to overcome the above deficiency and to provide means whereby entire totalizing mechanism, if necessary, may be brought into use to add items recorded in one column without being disturbed by the entrained recording devices which record items simultaneously in another column. The above mechanism enables the operator to bring in operative use the entire totalizing mechanism to add the items recorded in one column and, at the same time, to utilize other portions of the recording mechanism for recording nominal data without interfering with the operation of the totalizing mechanism in adding the numbers recorded in the adjacent column.

As above described the machines now on the market have their racks 9 and type carriers 12 connected by pin-and-slot connections 11. The type-carriers are actuated independently of their racks by springs 15 and during the latter operation of their movement move the racks by the pin-and-slot connections referred to, movement of both parts being stopped by engagement of the heels 18 on the racks with the set up pins 2 in the carriage. In the embodiment shown we have adopted this same construction for a number of type-carriers and gear parts at the right with respect to the operator. The number of type-carriers and gear parts so arranged may be determined by the purpose to which the machine is to be applied and for convenience of illustration we have shown a machine provided with nine type-carriers and their respective racks of which the five type-carriers at the right with respect to the operator are provided with the well known pin-and-slot connections 11 above described and the racks have the heels 18 connected thereto. The remaining type-carriers at the left, four in number in the present instance, have projecting arms 30 and heel pins 31 attached to the lower ends of said arms and extending under the racks which have no heels so that when these type-carriers and racks move forwardly to record as previously described, said heels 31 on these four type-carriers will strike against any pins in the carriage that may have been positioned therefor and thereby stop the type-carriers in position to record the proper digits. The extensions 30 on these type-carriers at the left are on rearwardly projecting portions of the type-carriers as shown in Figs. 17 and 18 and the slots 32 in these type-carriers are extended into the rearwardly projecting portions as shown. This enables the type-carriers to move forwardly their full distance without any movement on the part of the connected racks which is the operation when the recording mechanism is to be utilized without operation thereby of the entrained adding mechanism. Couplings are provided between these type-carriers and their racks whereby the racks may be caused to operate whenever it is desired to use them for adding purposes each coupling comprising a coupling bar 33 pivoted to the type-carrier and actuated upwardly by a spring 34 and provided with an abutment pin 35 on the type-carrier whereby its upward movement is limited. Two projections 36 on each coupling bar 33 embrace between them a projection 37 on the rack and will move the rack when the coupling is in engagement. It is obvious however, that when the projections 36 are disengaged from the projection 37 the type-carriers will move without any movement on the part of the racks and we will now describe the mechanism for controlling these couplings to cause or prevent operation of the racks, as desired.

A bell-crank lever 38 pivoted to the base of the machine under the key-board has one arm projecting through a slot 39 in the key-board plate and a link 40 connecting the other arm with a lever 41 attached to a rock shaft 42 at the rear end of the machine. (Figs. 1, 13 and 14.) Two arms 43 attached to the rock shaft support a rod 44 extending transversely over the rear ends of the coupling bars 33 when the type-carriers are in their idle position. A sleeve 45 encircles the shaft 44. The lever 38 may be actuated forwardly to raise the rod 44 and sleeve 45 to such an altitude as will permit the coupling bars 33 to engage with the projections 37. In such adjustment the lever 38 may be held by a projection 46 (Fig. 14) with which it may be engaged. When so adjusted the entire recording mechanism and totalizing mechanism are entrained for regular listing and adding purposes which may be performed in one or more columns by proper adjustment of the printing-control devices as above described and as is well understood by those familiar with this class of adding machines. When the lever 38 is in its rearward position, the rod 44 and sleeve 45 thereon are actuated downwardly by weight or otherwise effectively to disengage the coupling bars 33 from the projection 37 which adjustment will permit use of the type-carriers at this side of the machine for printing purposes without causing operation of their connected racks, or of the entrained recording mechanism.

In Fig. 15 is an illustration of a column of items and their total as recorded when all the type-carriers and their racks are coöperatively related by the couplings 33. Fig. 16 illustrates two columns of data of which the one at the right is totalized and its total recorded, while the one at the left is recorded by the type-carriers when the couplings 33 are disengaged from the projections 37 and consequently there is no total in the machine and none is recorded of that column of figures recorded by these type-carriers.

When it is desired to record any total contained in the machine such result may be attained only after depression of the total key 47 which, by a series of levers 48 pushes rearwardly a link 49 the rear end of which is mounted to a lever 50 on a shaft 51 at the rear of the machine. This construction is well known and for present purposes it will be sufficient to state that after depression of the total key, the total contained in the total wheels will be recorded on forward movement of the type-carriers. An upwardly extending arm of the lever 50 together with an arm 52 supports a rod 53 which will be swung forwardly when the total key is depressed. These parts which are found in the machines now on the market are utilized also to release the rod 44 and sleeve 45 from the coupling bars 33, and permit the latter to join the type-carriers and gear parts so that any total contained in the machine may be recorded without operation of the lever 38 to release the couplings. A bell-crank lever 54 has one arm extending in front of the rod 53 and the other arm connected by a link 55 with the rod 44 whereby operation of the total key will result in raising said rod 44 and permitting the coupling bars to engage with the projections 37 on the racks. A supporting plate 56 is pivoted at 57 and is actuated forwardly by a spring 58. Said plate is provided with a notch 59 in its upper forward portion adapted to receive the rod 44 when said rod is in its elevated position to which it is moved, as stated, at each operation of the total key. When the total key is depressed and the rod 44 is raised the plate 56 will move forwardly in position to receive said rod 44 within the notch 59 and thereby uphold said rod. This permits the coupling bars 33 to engage the projections 37 and thereby cause the racks 9 to move forwardly to cause the type-carriers to record any total represented in the total wheels. In instances of work as shown in Fig. 16 where only one column of items or figures is added there will be no total represented in the wheels at the left except in instances where carrying from the lower orders has occurred. The coupling of the type-carriers and racks as effected by the operation of the total key will permit the correct total to be recorded howsoever such total may have been produced. The plate 57 is provided with a lateral extension 60 against which the ends of the coupling members 33 will strike when the recording mechanism returns to idle position, as shown in Figs. 5 and 17. This will permit the rod 44 to be drawn downwardly by a weight of the parts or by a suitable actuating spring 61 (Fig. 4) except in cases where the lever 38 is locked to sustain rod 44 in its elevated adjustment.

It is understood that, in this class of machines, the racks 9 must be permitted to have certain movement backwardly from their normal or idle positions in order to effect carrying from lower to higher orders in the totalizing mechanism. This movement is independent of the type-carriers and is as essential in the novel mechanism comprising the present invention as it is in the machines of usual construction. This independent movement is provided for by the space separating the projections 36, which space is sufficient to permit any rack to move rearwardly independently of its type-carrier a sufficient distance to rotate its entrained total wheel one tooth or space, thereby producing the result of carrying.

In using this machine for ordinary listing and adding, in which all the items are recorded in a single column, the lever 38 will be adjusted in front of the projection 46 thereby permanently upholding the rod 44 and permitting the coupling bars 33 permanently to unite the type-carriers and racks. After each number is set up in the carriage 3 the arms 13 are swung forwardly and the type-carriers will be advanced by their springs 15. The type-carriers at the right will be stopped in recording position by engagement of the heels 18 of the racks against pins 2 in the path of movement of said heels. Such of the type-carriers at the left as may be utilized for ordinary listing and adding will be stopped by engagement of their extended arms 31 against the proper pins in the carriage. This alines the proper type at the printing line on the platen whereon record will be made by automatic operation of the hammers 21 in the usual and well understood manner.

When it is desired to record numbers in parallel columns simultaneously and produce totals thereof this also may be accomplished on this machine by adjusting the well understood "split" device 25 which will prevent operation of the hammers between the two columns. The construction and operation of the "split" devices referred to are well understood and do not require further detailed description.

In using the machine to record and produce a total of one column of items and to record simultaneously a parallel column of identifying data without making a confusing total of the last named column it is only necessary to release the lever 38 from engagement in front of the projection 46 whereupon the rod 44 will be drawn downwardly by gravity or, if desired, by a spring 61. This will, as above described, cause the rod 44 to disconnect the coupling bars 33 from the racks and permit the type-carriers to be reciprocated without operation of the racks and therefore without disturbing the total wheels entrained with these disconnected racks. In taking any total the entire totalizing mechanism may be cleared as usual for the reason that operation of the total key which is necessary for recording any total automatically raises the disconnecting rod 44 and permits union of the coupling devices. It will be observed also that should any total be represented in the wheels at the left the entrained type-carriers may be operated to record items or other data without previously clearing the total wheels and without disturbing the total therein. This operation may be performed at any time by simply disconnecting the coupling bars 33 from the racks to permit independent operation of the type-carriers.

We are aware that there may be various modifications and alterations in the construction and arrangement of this invention without the least departure from the spirit and scope of the invention. We are also aware that the invention is as readily adaptable for other species of adding and recording machines as well as with the cross-carriage type with which we have illustrated it.

We do not restrict ourselves to specific arrangements or methods of construction nor to uses of the invention in any specific machine, but

What we claim and desire to secure by Letters Patent of the United States is:

1. In an adding machine, type-carriers, mechanism whereby said type-carriers may be caused to record one or more columns of data at a single operation, a rack for each type-carrier, an adding wheel operatively related to each rack, a carriage whose operation is necessary before said type-carriers and racks may be operated, and means for controlling said racks effectively to prevent addition of the data in one of said columns, as desired.

2. In an adding machine, type-carriers operable to record numbers, racks, adding wheels enmeshed with said racks, means for operating said racks and thereby the adding wheels when the type-carriers are operated, and means for disconnecting said racks from the type-carriers, substantially as described.

3. In an adding machine, a series of type-carriers operable side by side effectively to record a number of columns of items at a single operation, racks, devices connecting said racks and type-carriers, means for disconnecting said racks from said type-carriers, and adding mechanism operable automatically to add the items recorded in one of said columns, substantially as described.

4. In an adding machine, a series of type carriers operable to record a number of columns of items at a single operation, a shaft, adding wheels mounted on said shaft and held permanently in axial alinement, a carriage whose operation is necessary before said adding wheels may be operated, mechanism for causing said adding wheels to add the items recorded in one of said columns only, or in all of said columns as desired, and means for extending the total of one column of items from the adding wheels for that column into the adding wheels for another column, substantially as specified.

5. In an adding machine, a movable carriage, means for setting up a plurality of numbers in said carriage, type-carriers operable effectively to record all of said numbers in separate columns at a single operation, and adding mechanism operable automatically to add the numbers recorded in one of said columns only, substantially as described.

6. In an adding machine, a movable carriage, means for setting up a plurality of numbers in said carriage, type-carriers operable to record all of said numbers at a single operation, adding mechanism, and means for causing said adding mechanism to add only one of the numbers recorded at each operation of said type-carriers, substantially as described.

7. In an adding machine, a movable carriage, means for setting up a plurality of numbers in said carriage, mechanism operable to record said numbers in separable columns at a single operation, and mechanism operable to add only one, or all of said numbers separately, as desired, substantially as described.

8. In an adding machine, a carriage movable therein, means for setting up numbers in said carriage, devices operable to record said numbers, adding mechanism, means for operating said adding mechanism effectively to add said numbers, and means for preventing operation of said adding mechanism when said numbers are recorded, substantially as described.

9. In an adding machine, a series of type-carriers operable side by side effectively to record numbers, adding mechanism, racks, means for operating said racks effectively to cause said adding mechanism to add the numbers recorded, and means for preventing said racks from operating when numbers are recorded, substantially as described.

10. In an adding machine, a carriage movable therein, levers operable to set up numbers in said carriage, recording mechanism operable to record in separate columns at a single operation a plurality of numbers represented in said carriage, adding mechanism, and means for causing said adding mechanism to add only one of the numbers recorded at each operation, or all of said numbers so recorded, as desired, substantially as described.

11. In an adding machine, a movable carriage, means for setting up numbers in different potential columns in said carriage, recording mechanism operable to record said numbers in separate columns at a single operation, and adding mechanism operable to add one of said numbers after it has been recorded, substantially as described.

12. In an adding machine, a movable carriage, means for setting up numbers in separate potential columns in said carriage, recording mechanism operable to record said numbers at a single operation in separate parallel columns, adding mechanism, and entraining devices under control of the operator whereby one or all of said numbers so recorded may be added as desired, substantially as described.

13. In an adding machine, a movable carriage, means for setting up numbers in different potential columns in said carriage, adding mechanism, and mechanism operable to cause said adding mechanism to add one or all of said numbers, substantially as specified.

14. In an adding machine, a movable carriage, means for setting up numbers in different potential columns in said carriage, mechanism operable to record said numbers in different columns at a single operation, and mechanism operable to add only the numbers in one column when said operation is desired, substantially as specified.

15. In an adding machine, a movable carriage, means for setting up numbers in different potential columns in said carriage, type-carriers operable to record said numbers in different columns, racks coöperating with said type-carriers, adding mechanism, and mechanism for controlling said racks and adding mechanism effectively to add only the numbers recorded in one of said columns, substantially as specified.

16. In an adding machine, keys, parts adjustable incidentally to the operation of said keys to represent numbers, a carriage for moving said parts, mechanism operable to record members in one or more columns at a single operation, adding mechanism operable to add one or more of said columns as desired, means for preventing the adding of numbers recorded in one of said columns and means for effecting carrying or transferring from that part of the adding mechanism corresponding to one column to that part corresponding to another column producing an extended total.

17. In an adding machine, keys, a carriage, parts in said carriage adjustable incidentally to the operation of said keys to represent numbers, means for moving said carriage, mechanism operable to record numbers in one or more columns at a single operation, adding mechanism operable to add one or more of said columns as desired, means for preventing the adding of numbers recorded in one of said columns and means for effecting carrying or transferring from that part of the adding mechanism corresponding to one column to that part corresponding to another column producing an extended total.

18. In an adding machine, keys, parts adjustable incidentally to the operation of said keys to represent numbers, a carriage for moving said parts, mechanism operable to record numbers in one or more columns at a single operation, adding mechanism operable to add one or more of said columns as desired, means for preventing the adding of numbers recorded in one of said columns, means for effecting carrying or transferring from that part of the adding mechanism corresponding to one column to that part corresponding to another column producing an extended total, and means for causing said recording mechanism to record said extended total.

19. In an adding machine, keys, a carriage, parts in said carriage adjustable incidentally to the operation of said keys to represent numbers, mechanism operable to record numbers in one or more columns at a single operation, adding mechanism operable to add one or more of said columns as desired, means for effecting carrying or transferring from that part of the adding mechanism corresponding to one column to that part corresponding to another column producing an extended total, and means for causing said recording mechanism to record said extended total.

20. In an adding machine, the series of type-carriers, mechanism for operating said type-carriers to record two or more columns simultaneously, a movable carriage whose operation is necessary before said type-carriers may be operated, and adding mechanism operable to add the numbers recorded in all of said columns, of means under the control of the operator for preventing the addition of numbers recorded in certain of said columns, substantially as specified.

In witness whereof we have hereunto set our hands and affixed our seals, in the presence of two subscribing witnesses.

JAMES L. DALTON. [L. S.]
JOHN MAGNUS. [L. S.]

Witnesses for James L. Dalton:
J. D. RIPPEY,
L. C. KINGSLAND.

Witnesses for John Magnus:
CHARLES PICKLES,
SEELY C. BUNN.

Copies of this patent may be obtained for five cents each, by addressing the "Commissioner of Patents, Washington, D. C."